US006684645B2

(12) United States Patent
Chu et al.

(10) Patent No.: US 6,684,645 B2
(45) Date of Patent: Feb. 3, 2004

(54) COOLING BY RESONATOR-INDUCED COHERENT SCATTERING OF RADIATION

(75) Inventors: Steven Chu, Stanford, CA (US); Vladan Vuletic, Stanford, CA (US)

(73) Assignee: The Board of Trustees of the Leland Stamford Junior University, Stanford, CA (US)

(*) Notice: Subject to any disclaimer, the term of this patent is extended or adjusted under 35 U.S.C. 154(b) by 0 days.

(21) Appl. No.: 10/117,787

(22) Filed: Apr. 4, 2002

(65) Prior Publication Data

US 2003/0136131 A1 Jul. 24, 2003

Related U.S. Application Data

(60) Provisional application No. 60/281,912, filed on Apr. 4, 2001.

(51) Int. Cl.[7] ............................ F25B 21/00; H01S 1/00; H01S 3/00

(52) U.S. Cl. ............................ 62/3.1; 62/467; 250/251

(58) Field of Search .......................... 62/3.1, 467, 268; 250/251

(56) References Cited

U.S. PATENT DOCUMENTS

| | | | | |
|---|---|---|---|---|
| 5,113,661 A | * | 5/1992 | Deeks | 62/3.1 |
| 5,337,324 A | * | 8/1994 | Ohtsu et al. | 372/32 |
| 5,338,930 A | | 8/1994 | Chu et al. | 250/251 |
| 5,447,032 A | * | 9/1995 | Epstein et al. | 62/3.1 |
| 5,528,028 A | | 6/1996 | Chu et al. | 250/251 |
| 5,615,558 A | * | 4/1997 | Cornell et al. | 62/56 |
| 6,041,610 A | * | 3/2000 | Edwards et al. | 62/264 |
| 2002/0125418 A1 | * | 9/2002 | Kajita | 250/251 |

OTHER PUBLICATIONS

S. Chu et al., "Three–Dimensional Viscous Confinement and Cooling of Atoms by Resonance Radiation Pressure," Physical Review Letters, vol. 55, pp. 48–51, (1985).

T.W. Hänsch and A.L. Schawlow, "Cooling of Gases by Laser Radiation," Optics Communications, vol. 13, p. 68, (1975).

C.E. Mungan et al., "Laser Cooling of a Solid by 16 K Starting from Room Temperature," Physical Review Letters, 78, pp. 1030–1033 (1997).

J.L. Clark and G. Rumbles, "Laser Cooling in the Condensed Phase by Frequency Up–Conversion," Physical Review Letters, 76, pp. 2037–2040, (1996).

R.I. Epstein et al., "Observation of Laser–Induced Fluorescent Cooling of a Solid," Nature, 377, pp. 500 (1995).

T.W. Mossberg et al., describe in "Trapping and Cooling of Atoms in a Vacuum Perturbed in a Frequency–Dependent Manner", Physical Review Letters, vol. 67, No. 13, pp. 1723–1726 (Sep. 23, 1991).

P. Horak et al. in "Cavity–Induced Atom Cooling in the Strong Coupling Regime", Physical Review Letters, vol. 79, No. 25, pp. 4974–4977 (Dec. 22, 1997).

* cited by examiner

*Primary Examiner*—William C. Doerrler
(74) *Attorney, Agent, or Firm*—Lumen Intellectual Property Services, Inc.

(57) ABSTRACT

The invention relates to a method and apparatus for cooling multilevel entities such as atoms, ions or molecules as well as entities with no apparent internal structure. Cooling is achieved by coherent scattering, where the frequency of the emitted radiation exceeds the frequency of the illumination radiation. Such coherent scattering is achieved by placing the entities in a resonator containing in which the cavity length and mirror coating are selected to support a resonant radiation. The entities are illuminated with an illumination radiation whose energy is lower than that of the resonant radiation supported by the resonator by a certain detuning energy selected such that coherent scattering of resonant radiation from the entities at a higher frequency than that of the illumination radiation is promoted by the resonator. As a result of the coherent scattering energy is carried away from the entities and they are cooled.

19 Claims, 5 Drawing Sheets

COOLING BY RESONATOR-INDUCED COHERENT SCATTERING OF RADIATION

RELATED APPLICATIONS

This application claims priority from Provisional Application 60/281,912 filed on Apr. 4, 2001 and herein incorporated by reference.

FIELD OF THE INVENTION

The present invention relates generally to the cooling of multilevel entities such as atoms, ions or molecules, and in particular to the cooling of such entities by promoting coherent scattering of light from them with the aid of a resonator.

BACKGROUND

The question how to efficiently cool atoms or how to reduce their kinetic energy arises in many circumstances, including situations where accurate measurements of atomic energy levels are required. For example, an atomic clock based on the Ramsey method requires knowledge of the energy levels (transition frequencies) of cesium atoms for calibration purposes. The cesium atoms have to be moving slowly to yield sufficiently accurate energy level measurements. A good method to achieve this result is to cool the cesium atoms. In numerous other applications, atoms have to be confined within small volumes and a convenient technique of accomplishing this goal is to reduce their kinetic energy through cooling.

An effective way to cool atoms with the aid of electromagnetic radiation was developed in the 1980's by Steven Chu and is described in S. Chu et al., Physical Review Letters, Vol. 55, pp. 48–51, (1985). Under most circumstances irradiating atoms is with electromagnetic radiation will cause heating. Under special conditions, however, it is possible to use pairs of laser beams properly positioned and operated to reduce atomic motion. Upon this discovery laser cooling of cesium atoms was adapted in atomic clocks as described, for example, in U.S. Pat. Nos. 5,338,930; 5,528,028 awarded to Chu et al. In fact, laser cooling has also been a tremendously successful technique for creating high-brightness atomic sources for various other applications, as proposed by T. W. Hänsch and A. L. Schawlow, Optics Communications, Vol. 13, p. 68, (1975).

Early laser cooling experiments were performed inside atom traps, such as magnetic bottles. The atoms were cooled when they encountered a laser beam containing photons coming at them with an energy that was less by an amount $\Delta$ than the energy that would normally be absorbed if the atoms were stationary. In fact, the moving atom can absorb lower energy photons than the stationary atom as long as the detuning $\Delta$ compensates for the Doppler effect of the moving atom. Later, the atom emits a photon whose frequency is equal to the energy of the absorbed photon plus the Doppler effect $v/\lambda$, where $v$ is the atom's velocity and $\lambda$ is the wavelength of the light. In other words, the emitted photon has a higher energy than the energy of the absorbed photon by the amount of Doppler effect, which is also the amount of kinetic energy the atom loses in the process.

On the heels of the above discovery, the general principle of absorbing lower energy photons and emitting higher energy photons to carry away kinetic energy and achieve cooling has been studied in more detail. For example, in U.S. Pat. No. 5,615,558 Cornell et al. teach a device and method for laser cooling of a solid to extremely low temperature using a high purity surface passivated direct band gap semiconductor crystal. The crystal is cooled when illuminated by a laser beam. Cooling is caused by emission of photons of higher energy than photons entering the crystal, the additional energy being accounted for by absorption of thermal phonons from the crystal lattice.

The prior art also teaches a fluorescent refrigerator in which a working material absorbs substantially monochromatic electromagnetic radiation at one frequency and then emits fluorescent radiation that has, on the average, a higher frequency. More energy is thereby removed from the working material than is introduced into the material, the difference between the output energy flux and the input energy flux being supplied by the thermal energy of the working material. More recent laboratory measurements have demonstrated laser-induced optical refrigeration in solids and liquids, see, e.g., C. E. Mungan et al., Physical Review Letters, 78, pp. 1030–1033 (1997) and J. L. Clark and G. Rumbles, Physical Review Letters, 76, pp. 2037–2040, (1996). More information on fluorescent refrigeration can also be found in U.S. Pat. No. 5,447,032 to Epstein et al. and R. I. Epstein et al., Nature, 377, pp. 500 (1995).

In U.S. Pat. No. 6,041,610 Edwards et al. teach improvements to an optical refrigerator operating on the above-described principles by using reflectivity-tuned dielectric mirrors. Again, the working materials are pumped using monochromatic radiation such that the resulting fluorescence has an average photon energy higher than that of the pumping radiation. The parallel-mirrored faces of the mirrors are employed to increase the optical path of the incident pumping radiation within the working material by multiple reflections. The mirrors are chosen to allow the higher-energy fluorescence photons to escape from the working material to carry away thermal energy while inhibiting the escape of the lower-energy photons that are consequentially partially trapped in the working material and ultimately reabsorbed to promote further fluorescence. This approach of extending the optical path length of the lower energy photons and minimizing the path length of higher energy fluorescence photons increases the optical refrigerator efficiency.

The prior art also addresses alternative ways of trapping atoms for cooling. T. W. Mossberg et al. describe in "Trapping and Cooling of Atoms in a Vacuum Perturbed in a Frequency-Dependent Manner", Physical Review Letters, Vol. 67, No. 13, pp. 1723–6 (Sep. 23, 1991) how trapping atoms in colored vacua can achieve large capture velocities and capability to cool to temperatures well below the Doppler limit present in free-space cooling techniques. For example, colored vacua can be achieved in suitably designed resonant cavities, and, according to the findings of T. W. Mossberg et al., can dramatically enhance the effect of transfer of kinetic energy of two-level atoms into the electromagnetic-field energy (also referred to as a Sisyphus-type effect).

Further possibilities for all optical trapping and cooling of two-level atoms are explored by P. Horak et al. in "Cavity-Induced Atom Cooling in the Strong Coupling Regime", Physical Review Letters, Vol. 79, No. 25, pp. 4974–4977 (Dec. 22, 1997). The authors concentrate on trapping and cooling a single atom at the antinodes of a high Q cavity mode to which the atom is strongly coupled.

All of the above-discussed methods of cooling atoms and materials have a number of shortcomings. The methods for cooling atoms in free space with suitable laser beams are limited by the Doppler recoil limit, at which on-coming photons will no longer be absorbed and the atom that is to be cooled recoils. In addition, all of the above-mentioned techniques can only be used in cooling two-level atoms that have a well-defined internal structure, i.e., a dominant two-level absorptive transition. That is because the detuning energy Δ has to be specifically selected with the two-level transition in mind, as the atom has to absorb many photons with this detuning energy Δ to experience appreciable cooling. These criteria severely limit the types of atoms that can be cooled by the prior art techniques.

Most atoms and all molecules have multiple ground states to which the excited state can decay. Once the atom reaches a different ground state, the laser no longer has the correct detuning relative to the atomic transition, and the cooling stops. In particular, molecules have many vibrational and rotational levels, and consequently no laser cooling of molecules has been demonstrated. If we could learn how to cool, trap and manipulate larger molecules in the same way as atoms, this would open the door for important developments in chemistry and biology.

OBJECTS AND ADVANTAGES

In view of the shortcomings of the prior art, it is a primary object of the present invention to provide a method and apparatus for efficiently cooling multilevel entities including atoms, ions and molecules, as well as entities without an internal level structure in the optical domain, including electrons and protons. More particularly, the invention is intended to provide for cooling such multilevel entities below the Doppler limit.

It is another object of the invention to provide a cooling technique that can be implemented in a straightforward manner in well-known types of optical cavities.

These and numerous other advantages of the present invention will become apparent upon reading the following description.

SUMMARY THE INVENTION

In accordance with the present invention multilevel entities such as atoms, ions or molecules are cooled by coherent scattering, where the frequency of the emitted radiation exceeds the frequency of the illumination radiation. Such coherent scattering is achieved in a resonator, typically a cavity provided for containing the multilevel entities. The cavity length and mirror coating are selected to support a resonant radiation. The multilevel entities are illuminated with an illumination radiation whose energy is lower than that of the resonant radiation supported by the resonator. Specifically, the energy of the illumination radiation is lower by a certain detuning energy from that of the resonant radiation. The detuning energy is selected such that coherent scattering of resonant radiation from the multilevel entities at a higher frequency than that of the illumination radiation is promoted by the resonator. As a result of the coherent scattering energy is carried away from the entities and they are cooled. Since the detuning energy is selected with respect to the energy of the resonant radiation supported by the cavity, rather than any specific atomic or molecular transition, the method of the invention can be used to cool the center-of-mass motion of various multilevel entities, including atoms, ions and molecules without concern for the energy levels of the multilevel entities. The entities can be present in the form of a gas, a solid or a liquid. The method can also be used to cool entities exhibiting no internal level structure at the frequencies of the illumination radiation (e.g., optical frequencies) including elementary particles such as electrons and protons.

In one embodiment of the invention the detuning energy is selected to correspond to an internal transition of at least one of the multilevel entities to further cool the internal degrees of freedom of that multilevel entity. The transition can be any energy transition, including a transition associated with a rotational and/or vibrational degree of freedom when the entity is a molecule. In cases where the multilevel entities are presented in the form of a solid, the detuning energy can be selected to correspond to an internal transition associated with a phonon.

In most embodiments, the illumination radiation is injected into the cavity, e.g., through the cavity mirrors or from the side. Preferably, the illumination radiation is provided by a laser.

In a preferred embodiment, the resonant radiation in the cavity is amplified. Conveniently, the level of amplification is adjusted such that a single-pass gain experienced by the resonant radiation in the cavity partly compensates or, preferably exceeds round-trip reflection losses sustained at the cavity mirrors. Such adjustment can be made, e.g., by selecting an appropriate amplifying medium. In this case the cavity with amplifying medium acts as a cavity with much higher mirror reflectivity, which enhances the cooling force.

The invention can be practiced in a number of optical cavities. For example, a spherical cavity can be used in order to maximize the solid angle subtended by the cavity such that a large number of the scattered photons contribute to the resonant radiation. It is preferable, however, to use a confocal cavity because such cavity provides a large cooling volume within which the entities can be trapped and cooled.

A detailed description of the invention and the preferred and alternative embodiments is presented below in reference to the attached drawing figures.

BRIEF DESCRIPTION OF THE DRAWING FIGURES

FIG. 1 is a diagram illustrating the fundamentals of the Doppler cooling principle in accordance with the prior art.

FIGS. 2A–B are diagrams illustrating the cavity Doppler cooling principle in accordance with the invention.

THEORETICAL REVIEW OF PRIOR ART DOPPLER COOLING

Figure 1:
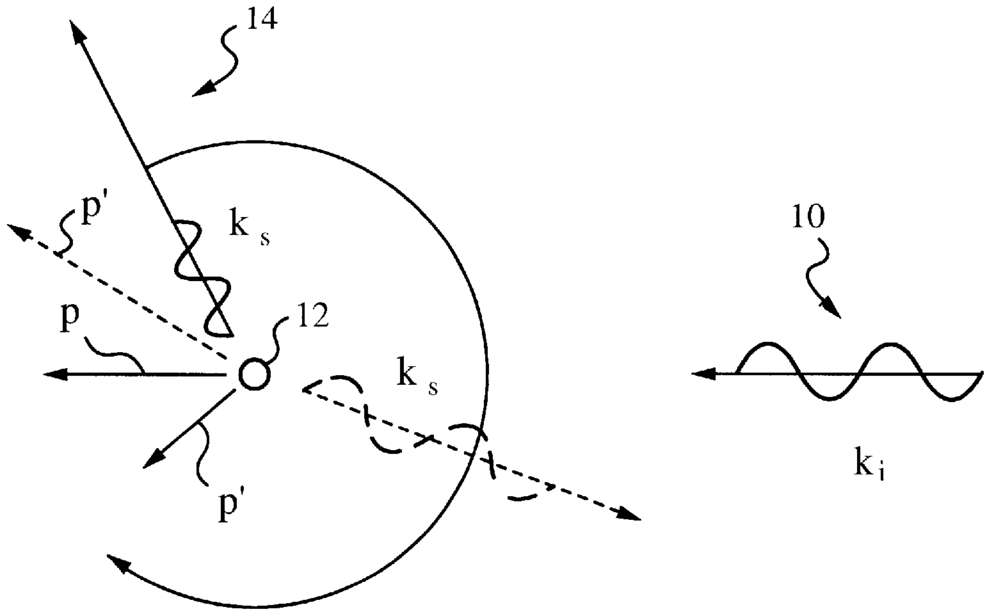
FIG. 1 (PRIOR ART)

The present invention will be best understood by first referring to FIG. 1 illustrating the principles of coherent scattering of an illumination radiation 10 from an atom 12 employed in the prior art. Atom 12 has a mass m, a momentum p=mv and a kinetic energy $W=p^2/2$ m. In these equations boldfaced parameters represent vector quantities. Illumination radiation 10 is a plane electromagnetic wave of wavevector $k_i$. It is assumed that radiation 10 is detuned by a detuning energy Δ which is more than one natural linewidth from any atomic transition and that its intensity is insufficient to saturate the transitions at the given detuning. Under these conditions the coherent scattering peak dominates the spectrum of a scattered radiation 14 while contributions from other effects, such as the incoherent Mollow triplet are negligible.

When atom 12 is fixed in space, scattered radiation 14 is monochromatic at the same frequency as illumination radiation 10. When atom 12 is free, the recoil of atom 12 has to be taken into account. Conservation of momentum in the scattering process requires that after emitting a photon of radiation 14 of wavevector $k_s$, atom 12 has a momentum p' such that:

$$p'=p+h(k_i-k_s), \quad \text{(equation 1)}$$

where h is Planck's constant divided by 2π. In addition, after emitting photon of light 14, atom 12 has a kinetic energy W' such that:

$$W'=W-h\Delta, \quad \text{(equation 2)}$$

where $$\Delta = -(k_i - k_s)\cdot v - \frac{\hbar(k_i - k_s)^2}{2m}. \quad \text{(equation 3)}$$

Energy conservation implies that the frequency of the scattered photon of radiation 14 is $ck_s=ck_i+\Delta$, where c is the speed of light. Thus, the frequency of scattered photon of radiation 14 depends on the scattering direction and is determined by the two-photon Doppler effect along the transferred momentum $h(k_i-k_s)$. In addition, scattering is accompanied by recoil heating as described by the last term of equation 3. If scattered photon of radiation 14 is blue-detuned with respect to illumination radiation 10, i.e., has a higher frequency than radiation 10 ($\Delta>0$), then kinetic energy W' is reduced in the scattering process and atom 12 is cooled. On the other hand, if scattered photon of radiation 14 is red-detuned with respect to illumination radiation 10, i.e., has a higher frequency than radiation 10 ($\Delta<0$), as indicated in dashed lines, then kinetic energy W' in increased in the scattering process and atom 12 is heated.

In conventional Doppler cooling of atoms the symmetry between the above-described positive and negative Doppler effects is broken by tuning illumination radiation 10 to the red (lower frequency) of a closed atomic transition (see, e.g., T. W. Hänsch and A. L. Schawlow, Optics Communications, Vol. 13, pp. 68 (1975)). Specifically, the red detuning leads to a preferential absorption of photons of illumination radiation 10 opposing the direction of atomic velocity v, and on average to a negative Doppler effect for illumination radiation 10 such that $\langle k_i \cdot v\rangle<0$, where the brackets indicate the expectation value. Meanwhile, scattered photon of light 14 has no preferred direction relative to atomic velocity v, and hence $\rangle k_s \cdot v\rangle=0$. Then, according to equation 3, the average frequency of scattered photon of light 14 exceeds that of the incident radiation 10, resulting in a reduction of the atom's kinetic energy (W'<W) or cooling.

Conventional Doppler cooling works well for atoms 12 with a closed optical transition but fails for multilevel entities such as atoms, ions or molecules with a multilevel internal structure. The reason is that the condition of small red detuning relative to the atomic transition cannot be met for more than one internal state at a time, except by using a large number of different incident frequencies of radiation 10.

DETAILED DESCRIPTION OF THE INVENTION

The invention is based on applying the realization that a change in the density of electromagnetic modes, as can be achieved inside a resonator such as an optical cavity, affects not only the spontaneous emission of photons by an entity that is in an excited state, but also modifies the coherent scattering of incident radiation by the entity. This follows from the close relationship between the emission of radiation by a free dipole oscillating at its natural frequency (spontaneous emission) and by a dipole oscillator that is driven by a weak external field (coherent scattering). These principles and their application in accordance with the invention will now be explained in reference to FIGS. 2A–B.

Figure 2A:
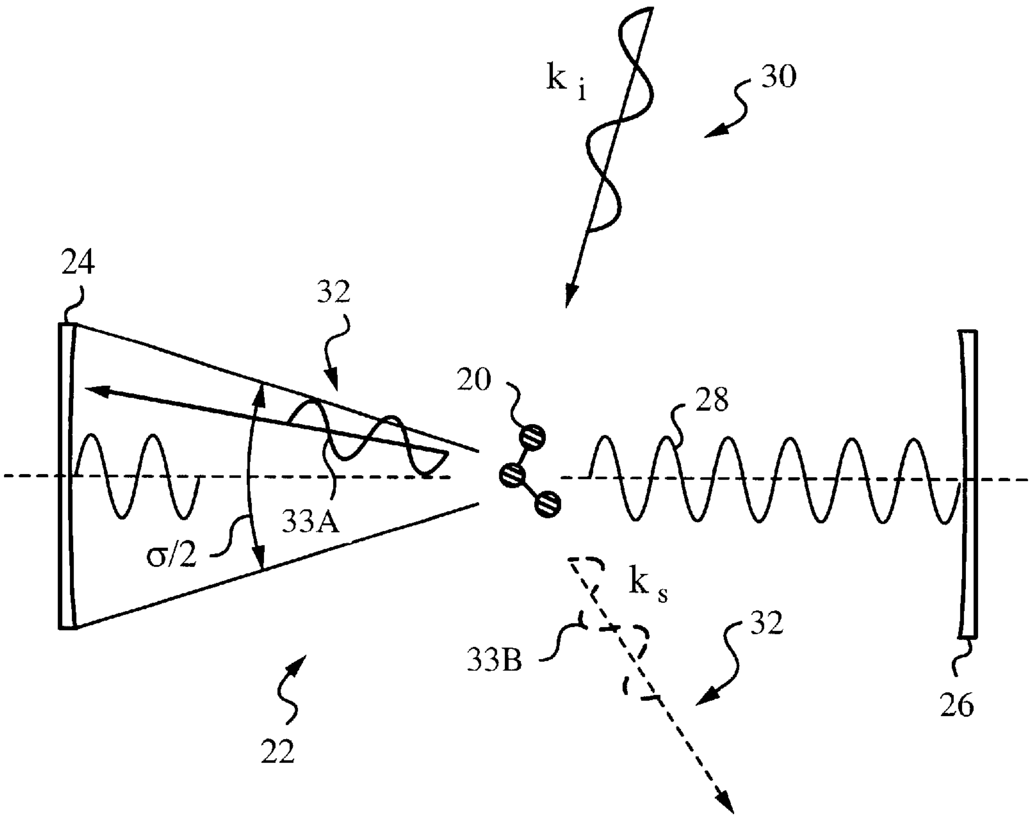
Figure 2B:
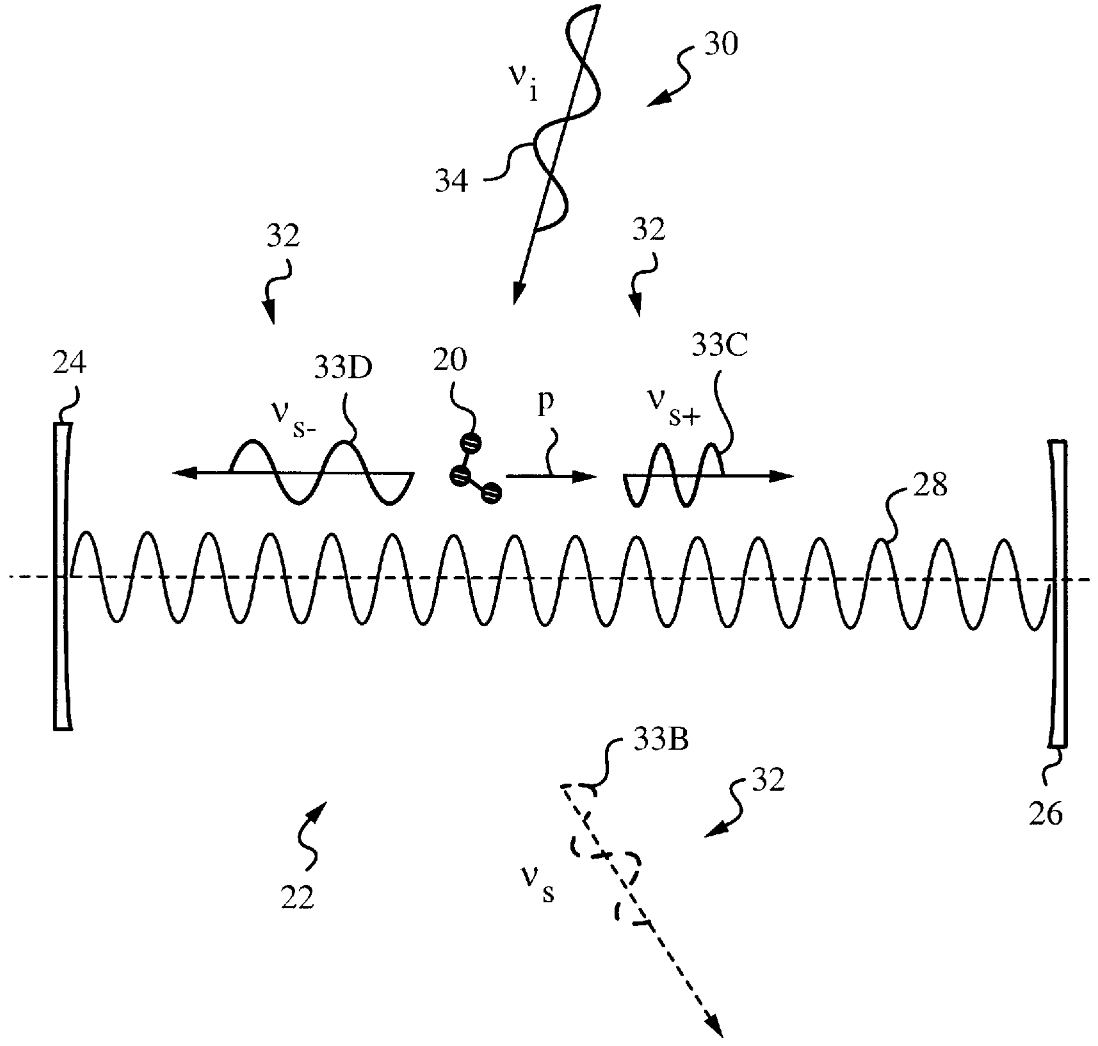

FIG. 2A shows a multilevel entity 20, in this case a gas molecule with a large number of internal energy states, including vibrational and rotational degrees of freedom. It is understood that entity 20 could be an atom or an ion. Molecule 20 is located in a resonator in the form of an optical cavity 22 defined between two reflectors 24, 26. In accordance with well-known principles, cavity 22 supports a resonant radiation 28 between reflectors 24, 26. Radiation 28 propagates in a single transverse mode, i.e., the $TEM_{00}$ mode, but it can also propagate in any of the allowed transverse and longitudinal modes, as will be appreciated by a person skilled in the art.

An illumination radiation 30 of wavevector $k_i$ is provided for illuminating molecule 20. The energy of illumination radiation 30 is lower than the energy of resonant radiation 28 by a certain detuning energy Δ. Detuning energy Δ of illumination radiation 30 is selected to promote coherent scattering of resonant radiation 28 from molecule 20 such that the motional or internal energy of molecule 20 is reduced in the process. In contrast to the prior art, scattering of higher energy resonant radiation 28 by molecule 20 is promoted not by any internal transitions of molecule 20 but by cavity 22 itself. In other words, cavity 22, which is tuned to the blue of illumination radiation 30 by detuning energy Δ, promotes molecule 20 to absorb illumination radiation 30 and emit scattered radiation 32 of wavevector $k_s$ that is scattered coherently into a transverse mode as resonant radiation 28.

Not all photons of scattered radiation 32 will be coherently scattered in the form of resonant radiation 28. First, scattered radiation 32 has to scatter into a solid angle σ subtended by reflectors 24, 26 in order to be captured as resonant radiation 28 in cavity 22. A photon 33A of scattered radiation 32 illustrated in FIG. 2A is coherently scattered within solid angle σ and can be captured in cavity 22. (Note that solid angle σ includes solid angles σ/2 subtended by each reflector on each side of cavity 22.) On the other hand, a photon 33B of scattered radiation 32 is scattered outside solid angle σ and cannot be captured. As will be appreciated by those skilled in the art, the scattering rate into cavity solid angle σ is increased in proportion to the finesse F of cavity 22 divided by π. Therefore, small solid angle σ is compensated for by ensuring that reflectors 24, 26 have a high reflectivity.

However, in order to achieve cooling of molecule 20 in accordance with the invention it is not sufficient that photon 33A be coherently scattered within solid angle σ. Scattered radiation 32 whose photons are coherently scattered within solid angle σ have to be forward-scattered by molecule 20 and be captured in cavity 22 as resonant radiation 28. This condition is better illustrated in the diagram of cavity 22 shown in FIG. 2B. Here, molecule 20 is illustrated moving to the right as indicated by its momentum vector p. After absorbing a photon 34 of illumination radiation 30, here described by its frequency $\nu_i$, molecule 20 can emit a forward-scattered photon 33C of scattered radiation 32 or a back-scattered photon 33D of scattered radiation 32. Forward-scattered photon 33C has a frequency $\nu_{s+}$ and back-scattered photon 33D has a frequency $\nu_{s-}$. The frequency $\nu_{s+}$ of forward-scattered photon 33C is higher than frequency $\nu_{s-}$ of back-scattered photon 33D because of the Doppler effect. Due to the recoil effect, photon 33D increases momentum p of molecule 20, while photon 33C decreases momentum p of molecule 20. Hence, only photon 33C carries energy away from molecule 20 and thus cools molecule 20. For this reason, cavity 22 is detuned to support resonant radiation 28 at frequency $\nu_{s+}$ rather than $\nu_{s-}$. To achieve this, the distance between reflectors 24, 26 is tuned such that frequency $\nu_{s-}$ of photon 33D is not supported by the cavity 22, as will be readily understood by those skilled in the art.

The cooling method of the invention can be expressed as cavity Doppler cooling. This method relies on a negative two-photon Doppler effect involving photon 34 of illumination radiation 30 and scattered photon 33C of scattered radiation 32. This condition can be described by using the equation for detuning frequency Δ:

$$\Delta = -(k_i - k_s)\cdot v - \frac{\hbar(k_i - k_s)^2}{2m}. \quad \text{(equation 3)}$$

Specifically, the negative two-photon Doppler effect is achieved in cavity 22 when the expectation value of the dot product is negative, or:

$$\langle (k_i - k_s)\cdot v\rangle < 0. \quad \text{(equation 4)}$$

Under this condition, molecule 20 will be cooled irrespective of its internal structure at a rate that is proportional to the coherent scattering rate into cavity 22. Since in cavity Doppler cooling according to the invention the dissipative force acts along the direction of the transferred momentum $h(k_i - k_s)$, it is possible to achieve two-dimensional or three-dimensional cooling using a single cavity and multiple illumination beams.

Figure 3:
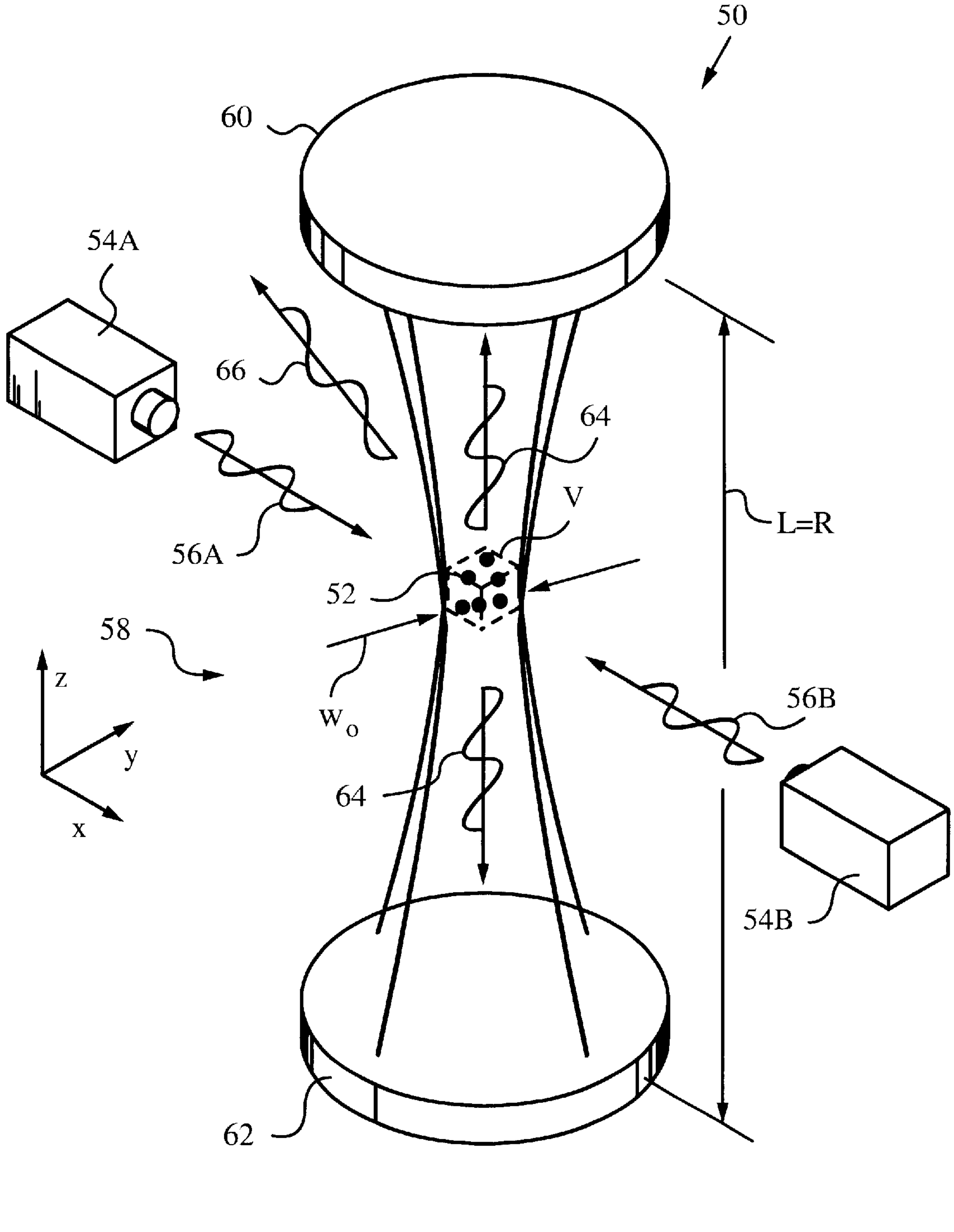
FIG. 3 is an isometric view of a preferred embodiment of an apparatus for cooling entities according to the invention.

FIG. 3 shows a preferred embodiment of an apparatus 50 with a resonator in the form of a confocal cavity 58 for cooling multilevel entities 52 in two dimensions. Apparatus 50 has two sources 54A, 54B of illumination radiation 56A, 56B. Preferably, sources 54A, 54B are lasers, since lasers are effective for providing monochromatic illumination radiation 56A, 56B with a well-defined detuning energy Δ. Lasers 54A, 54B are configured to deliver illumination radiation 56A, 56B in the form of plane waves of equal intensity and polarized along the y-axis. Illumination radiation 56A, 56B propagates along the positive and negative x-directions respectively. For three-dimensional cooling additional sources of illumination radiation polarized along the x-axis and propagating along the y-axis can be provided on either side of cavity 58.

Cavity 58 of apparatus 50 is oriented along the z-axis and has two reflectors 60, 62 separated by a distance L. Reflectors 60, 62 are convex and each has a radius of curvature R. Cavity 58 is confocal such that distance L is equal to the radius of curvature R (L=R). By virtue of being confocal, cavity 58 offers a relatively large volume V near its axis for containing entities 52 and simultaneously permits a large solid angle σ (see FIG. 2A) into which radiation can be scattered by entities 52 and captured by cavity 58.

Lasers 54A, 54B are aimed to deliver illumination radiation 56A, 56B to volume V where entities 52 are contained. Illumination radiation 56A, 56B is red-detuned by detuning energy Δ from a resonant radiation 64 supported by cavity 58.

During operation, entities 52 in volume V are cooled by coherently scattering resonant radiation 64 into the positive and negative z-direction within cavity 58. A person skilled in the art will appreciate that entire cavity 58 can be filled with entities 52, if desired, but cooling will only take place for entities 52 in volume V created by the overlap between the illumination radiation 56A, 56B from lasers 54A, 54B and the volume of the resonant cavity modes.

In analyzing the processes inside cavity 58, it is convenient to derive an expression for a cooling force f due to coherent scattering. f can be calculated as the rate of change of momentum of entities 52 arising from the frequency-dependent scattering rate from direction $\pm k_x$ into direction $\pm k_z$ of the mode of resonant radiation 64 supported by cavity 58. Thus, the cooling force can be expressed as:

$$f=\Gamma_w[h(k_x-k_z)L(\delta_{++})+h(k_x+k_z)L(\delta_{+-})+h(-k_x-k_z)L(\delta_{-+})+h(-k_x+k_z)L(\delta_{--})], \quad \text{(equation 5)}$$

where $\Gamma_w$ is the scattering rate from a single beam of illumination radiation 56 into a singe direction of cavity 58 mode in the absence of the cavity enhancement effect. $L(\delta_{\pm\pm})$ is the frequency dependent intensity enhancement factor of cavity 58 at detuning $\delta_{\pm\pm}$ of scattered radiation 64. From equation 3 it follows that $\delta_{\pm\pm}$ is related to the detuning $\delta_i$ of incident radiation 56 relative to cavity 58 resonance by $$\delta_{\pm\pm}=\delta_i-(\pm k_x \mp k_z)\cdot v; \quad \text{(equation 6)}$$

where $\delta_i=\delta_i-2hk^2/2$ m. Equation 5 that neglects the possibility of interference between different scattering events is correct in a ring resonator, where scattered photons travel in different directions, and remains true in linear cavity 58, as long as entities 52 are free, such that different scattering events result in distinguishable states of motion.

The scattering rate $\Gamma_w$ into a $TEM_{00}$ cavity mode (fundamental mode) without cavity enhancement can be calculated from the decomposition of the far-field dipole pattern into Gaussian transverse modes. For entity 52 centered on waist $w_o$ where $w_o >> \lambda$, and where λ is the wavelength of the cavity mode, this rate is given by $\Gamma_w=(3/k^2w_o^2)\Gamma_{sc}$, where $\Gamma_{sc}$ is the free-space scattering rate for a single beam of illumination radiation 56. The frequency dependent cavity enhancement function L(δ) is the classical intensity enhancement inside a cavity as described by an Airy function (see, e.g., D. J. Heinzen, et al., Physical Review Letters, Vol. 58, pp. 1320–1323 (1987)), that in the vicinity of a resonance can be written in the Lorentzian form:

$$L(\delta) = \frac{2E}{1+\left(\frac{\delta}{\gamma_c}\right)^2}. \quad \text{(equation 7)}$$

Here $\gamma_c$ is the cavity 58 decay rate constant for the field amplitude, δ is the detuning of scattered radiation 64 relative to cavity resonance and $E=q^{-2}$ the classical on-resonance power enhancement inside cavity 58 if each of reflectors 60, 62 has a fractional power loss $q^2$ per reflection. The finesse F of cavity 58 is given by F=πE. Thus, the force f due to scattering into cavity 58 can be written in the form of a friction force:

$$f = \hbar(k_x - k_z)\Gamma_{sc}\eta_o\frac{4\delta_i'\gamma_c^2(k_x - k_z)\cdot v}{(\gamma_c^2 + \delta_{++}^2)(\gamma_c^2 + \delta_{--}^2)} + \hbar(k_x + k_z)\Gamma_{sc}\eta_o\frac{4\delta_i'\gamma_c^2(k_x + k_z)\cdot v}{(\gamma_c^2 + \delta_{+-}^2)(\gamma_c^2 + \delta_{-+}^2)}. \quad \text{(equation 8)}$$

Here $$\eta_o = \frac{6E}{k^2 w_o^2} \quad \text{(equation 9)}$$

is the ratio of the power scattered into a single direction of cavity 58 to the power scattered into free space as scattered radiation 66. The recoil-shifted detuning $\delta_i$ of illumination radiation 56 relative to cavity resonance has to be negative in order for force f to cool entities 52.

In three-dimensional cooling counter propagating beams of illumination radiation along the y-axis and linearly polarized along the x-axis will add to cooling force f. In this case the cooling force f is just the sum of two two-dimensional cooling forces f as given by equation 8. Another possible three-dimensional cooling arrangement consists of three beams of illumination radiation arranged symmetrically in the x–y plane and polarized in the x–y plane.

At a certain point the cooling in three dimensions is limited due to recoil heating described by recoil energy $E_{rec}=h^2k^2/2$ m. In an arrangement with four beams of illumination radiation along the ±x-axis and ±y-axis the heating due to scattered radiation 66 into free space and into the cavity mode can be separated. As long as the cavity mode occupies only a small solid angle, the scattering into free space remains unaffected by the cavity. Since for the dipole pattern the average free-space heating is $(7/5)E_{rec}$ along the direction of illumination radiation and $(2/5)E_{rec}(1/5)E_{rec}$ along a direction perpendicular to (parallel to) the dipole, the average heating along a direction α=x,y,z per free-space scattering event is given by $C_\alpha E_{rec}$, where $C_x=C_y=4/5$ and $C_z=2/5$. The momentum fluctuations due to scattering into cavity 58, on the other hand, according to equation 3 on average heat entity 52 by an amount $D_{\alpha E rec}$ per such scattering event, where $D_x=D_y=1/2$ and $D_z=1$. When the linewidth $2\gamma_c$ of cavity 58 exceeds $E_{rec}/h$, as is necessary for cooling with monochromatic illumination radiation 56, the detuning that minimizes the temperature is given by $\delta_i=-\gamma_c$. The resulting kinetic temperature $T_{\alpha,min}$ along direction α, as calculated from the velocity at which the cooling rate equals the heating rate, is then $$k_B T_{\alpha,\min} = \frac{1}{2}\hbar\gamma_c\left(1 + \frac{C_\alpha}{\eta_o D_\alpha}\right), \quad \text{(equation 10)}$$

where $k_B$ is the Boltzmann constant. Scattering radiation 66 into free space ceases to limit the final temperature when the cavity-to-free space ratio $\eta_c$ exceeds unity, i.e., when the scattering rate into the cavity mode is larger than the scattering rate into free space. In this case the minimum temperature is lower than the usual Doppler limit of $h\gamma_c$ because cavity Doppler cooling in accordance with the invention makes use of photons of illumination radiation 56 and scattered radiation 64 to achieve cooling, whereas in conventional Doppler cooling the momentum of the scattered photon does not contribute to the cooling force.

A person skilled in the art will note that the cooling limit does not depend on internal parameters of entity 52 and is completely determined by the properties of cavity 58. In particular, a smaller cavity linewidth $\gamma_c$ according to equation 10 results in a lower temperature. It should also be noted that adjusting the quality of reflectors 60, 62 can further improve cooling quality. In particular, higher reflectivities will cause improved cooling. Also, since cavity 58 is confocal, it can support a number of resonant modes in addition to the fundamental $TEM_{00}$ and thus tremendously increases cooling volume V in comparison to a single transverse mode cavity. That is because the waist at reflectors 60, 62 is only $\sqrt{2}$ times larger than at the center of cavity 58, and all transverse modes with negligible diffraction losses are supported by cavity 58. In addition, the availability of these additional degenerate modes improves the cavity-to-free space ratio $\eta_o$ to yield:

$$\eta_{confocal} = \frac{2E}{2}3\Delta\frac{\Omega}{8\pi} = \frac{3}{2}E\left(\frac{r}{R}\right)^2, \quad \text{(equation 11)}$$

where 2r is the diameter of reflectors 60, 62, R is the radius of curvature of reflectors 60, 62, $\Delta\Omega=4\pi(r/R)^2$ is the solid angle subtended by one reflector, and a factor 1/2 accounts for the fact that only even modes contribute to the cooling. The intensity enhancement factor E is related to the multimode finesse of cavity 58 by $F_{conf}=(1/2)\pi E=\pi/2q^2$.

The cooling method of the invention can be implemented for cooling various types of multilevel entities 52. In an alternative embodiment, illumination radiation 56 can be selected to also correspond to an internal transition of at least one of multilevel entities 52, thereby further cooling at least one center-of-mass or at least one internal degree of freedom of that multilevel entity 52 in accordance to well-known Doppler cooling principles. The various degrees of freedom, which can be cooled, include any rotational and/or vibrational (roto-vibrational) degrees of freedom of the particular entity 52. Multilevel entities 52 can also be present in the form of a liquid, gas or solid. When entities 52 form a solid, illumination radiation 56 can be selected to correspond to a phonon energy supported by the solid. Thus, that phonon energy is removed in accordance with prior art principles. Furthermore, since the method of invention does not depend on the internal structure of entities 52 it is also possible to apply it to entities that have no internal structure. Specifically, such entities may not have any internal structure at the wavelengths used in illumination radiation 56. Such entities include elementary particles such as protons or electrons.

Figure 4:
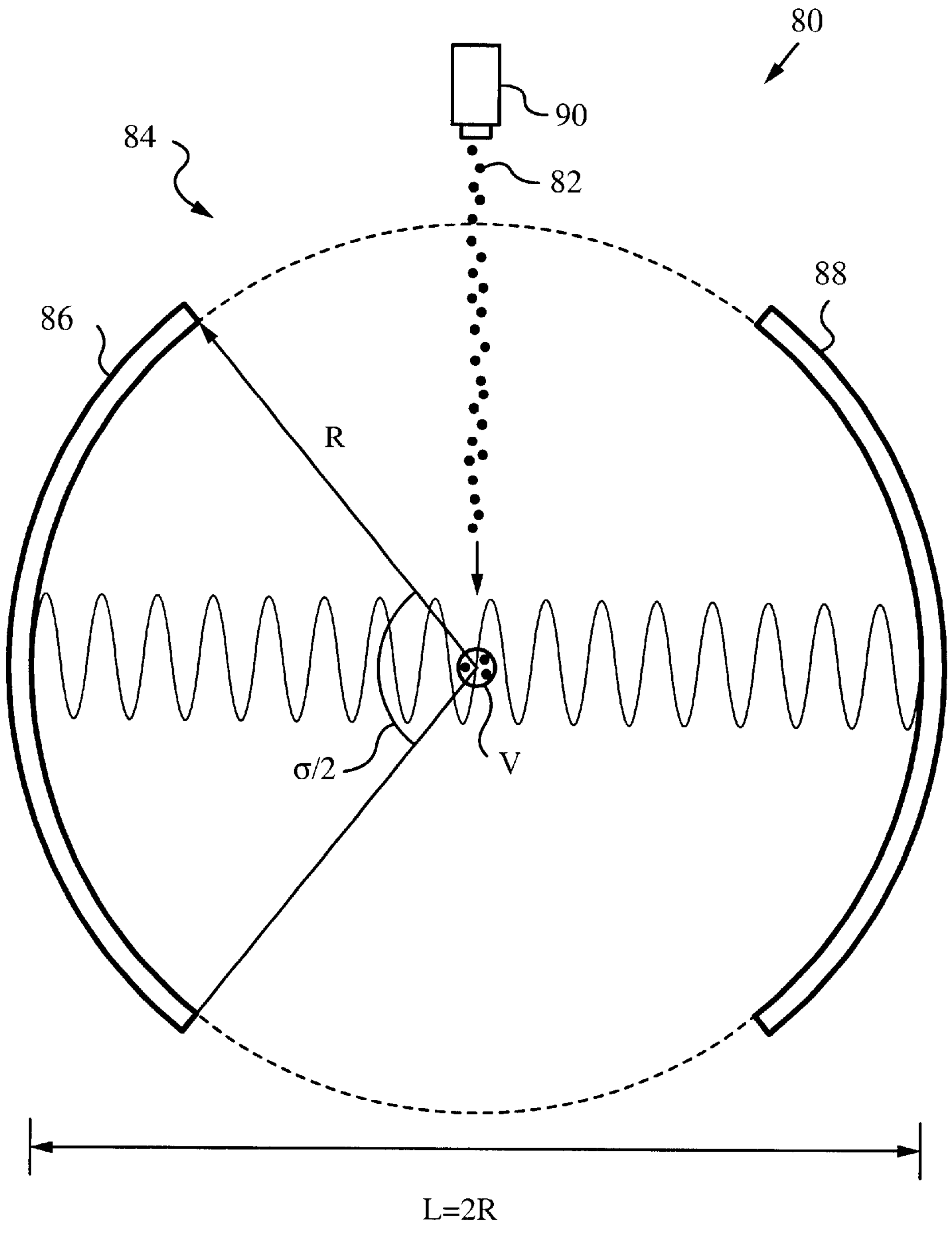
FIG. 4 is a diagram illustrating the cooling principle within a concentric cavity.

The cooling method of the invention can be implemented in various types of cavities other than confocal. For example, FIG. 4 illustrates an apparatus 80 for cooling entities 82 injected into a spherical cavity 84. Spherical cavity 84 has two spherical reflectors 86, 88 separated by a distance L=2R, where R is the diameter of curvature of reflectors 86, 88. Spherical cavities yield the largest cooling force f because spherical aberration is absent and the full solid angle α subtended by reflectors 86, 88 is available for cooling.

Apparatus 80 has a dispensing mechanism 90 for dispensing entities 82 into cavity 84. It will be understood that mechanism 90 has to be adapted to the types of entities 82 being dispensed, e.g., charged versus neutral, gaseous etc. Dispensing mechanism 90 is aimed at cooling volume V to provide for efficient delivery and cooling of entities 82.

A person skilled in the art will recognize that various types of reflectors can be used in resonators in accordance with the invention. For example, it is also possible to use parabolic reflectors and other curved reflectors, even in combination with flat reflectors.

Figure 5:
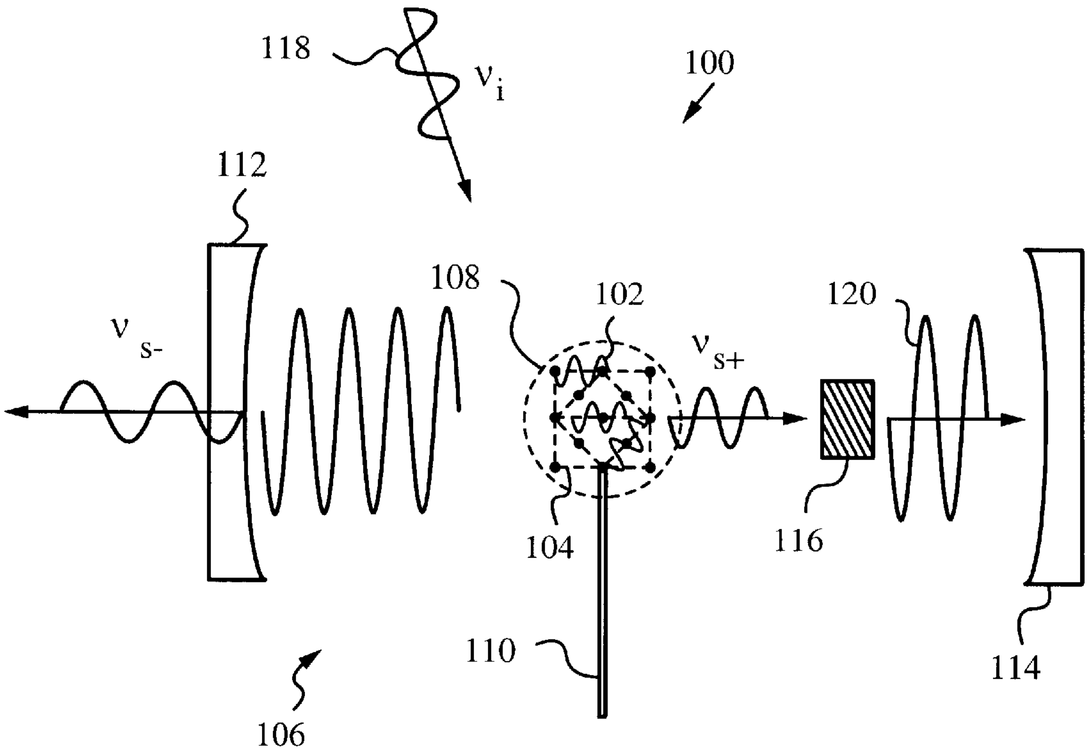
FIG. 5 is a diagram illustrating the cooling principle in a cavity with a gain medium.

FIG. 5 illustrates yet another embodiment of an apparatus 100 for cooling multilevel entities 102 forming a solid material 104 having a lattice structure. Material 104 is held on a support finger 110 in a confocal cavity 106 within a cooling volume 108. Confocal cavity 106 has two reflectors 112 and 114 with equal radii of curvature.

In contrast to the previous embodiments, apparatus 100 takes advantage of the fact that adding an amplifying medium 116 to provide optical gain within resonator 106 has the same effect as increasing the reflectivity of reflectors 112, 114 and improves the cooling performance in two ways: First, the scattering rate into cavity 106 is enhanced which according to equations 5,7 increases cooling force f. Second, the gain bandwidth of the system consisting of cavity 106 and optical gain medium 116 is reduced relative to the cavity without gain medium, resulting in a lower effective cavity linewidth $\gamma_c$, and according to equation 10 in a lower temperature.

To derive full advantage from amplifying medium 116, it is preferable that medium 116 be selected such that a single-pass gain of resonant radiation 120 in cavity 106 exceeds round-trip reflection losses sustained by radiation 120 at reflectors 112, 114. To achieve additional cooling in this embodiment, illumination radiation 118 can be tuned to a phonon energy in solid material 104.

Clearly, the above-described embodiments are merely exemplary of the various ways in which the method and apparatus of the invention can be implemented. Therefore, the full scope of protection should be judged based on the appended claims and their legal equivalents.

What is claimed is:

1. A method for cooling entities by coherent scattering, said method comprising:

a) providing a resonator for containing said entities, said resonator tuned to a resonant frequency;

b) illuminating said entities with an illumination radiation having an illumination frequency lower than said resonant frequency;

c) selecting the resonant frequency and the illumination frequency to promote coherent scattering of the illumination radiation by said entities to produce scattered radiation at said resonant frequency, thereby cooling said entities.

2. The method of claim 1, wherein said entities comprise entities without internal level structure selected from the group consisting of elementary particles.

3. The method of claim 1, wherein said entities comprise multilevel entities selected from the group consisting of atoms, ions and molecules.

4. The method of claim 3, wherein said multilevel entities comprise a substance selected from the group consisting of solids, liquids and gases.

5. The method of claim 3, wherein the resonant frequency and the illumination frequency are selected to correspond to an internal transition of at least one of said multilevel entities, thereby further cooling at least one center-of-mass or at least one internal degree of freedom of said multilevel entities.

6. The method of claim 5, wherein said internal transition corresponds to a roto-vibrational degree of freedom.

7. The method of claim 5, wherein said multilevel entities are in the form of a solid and a difference between the resonant frequency and the illumination frequency corresponds to a phonon.

8. The method of claim 1, wherein said illumination radiation is injected into said resonator.

9. The method of claim 1, wherein said illumination radiation is provided by a laser.

10. The method of claim 1, further comprising amplifying said scattered radiation at said resonant frequency.

11. The method of claim 10, wherein said amplifying is adjusted such that a single-pass gain of said scattered radiation at said resonant frequency in said resonator exceeds reflection losses.

12. An apparatus for cooling entities by coherent scattering, said apparatus comprising:

a) a resonator for containing said entities and tuned to a resonant frequency;

b) a light source or illuminating said entities contained in said resonator with an illumination radiation having an illumination frequency lower than said resonant frequency; wherein the illumination frequency and the resonant frequency are selected such that said resonator promotes coherent scattering of said resonant radiation from said entities to produce scattered radiation at said resonant frequency, thereby cooling said entities.

13. The apparatus of claim 12, wherein said light source is a laser.

14. The apparatus of claim 12, wherein said resonator is a spherical cavity.

15. The apparatus of claim 12, wherein said resonator is a confocal cavity.

16. The apparatus of claim 12, wherein said resonator further comprises an amplifying medium for amplifying said resonant radiation.

17. The method of claim 15, wherein said amplifying medium is selected such that a single-pass gain of said resonant radiation in said resonator exceeds round-trip reflection losses.

18. The apparatus of claim 12, wherein said entities comprise a gas, and said apparatus further comprises a means for projecting said gas into said resonator.

19. A method for cooling a material in a resonant cavity, the method comprising scattering within the resonant cavity incident radiation from the material to produce scattered radiation, wherein the scattered radiation has frequency equal to a resonant frequency of the resonant cavity, and wherein the incident radiation has a frequency lower than the resonant frequency of the resonant cavity, thereby cooling the material.

* * * * *

UNITED STATES PATENT AND TRADEMARK OFFICE
CERTIFICATE OF CORRECTION

PATENT NO. : 6,684,645 B2 
DATED : February 3, 2004
INVENTOR(S) : Steven Chu and Vladan Vuletic It is certified that error appears in the above-identified patent and that said Letters Patent is hereby corrected as shown below:

Column 24,
Line 6, add the following paragraph after the paragraph of RELATED APPLICATIONS:
-- STATEMENT REGARDING FEDERALLY SPONSORED RESEARCH OR DEVELOPMENT
This invention was made with Government support under contract 932014 awarded by the National Science Foundation. The Government has certain rights inthis invention --.

Signed and Sealed this

Fifteenth Day of March, 2005

JON W. DUDAS
*Director of the United States Patent and Trademark Office*

UNITED STATES PATENT AND TRADEMARK OFFICE

CERTIFICATE OF CORRECTION

PATENT NO. : 6,684,645 B2 
DATED : February 3, 2004
INVENTOR(S) : Steven Chu and Vladan Vuletic It is certified that error appears in the above-identified patent and that said Letters Patent is hereby corrected as shown below:

Column 1,
Line 6, add the following paragraph after the paragraph of "RELATED APPLICATIONS":
-- STATEMENT REGARDING FEDERALLY SPONSORED RESEARCH OR DEVELOPMENT This invention was made with Government support under contract F49620-98-1-0219 awarded by the Air Force Office of Scientific Research. The Government has certain rights in this invention. --

Signed and Sealed this

Seventh Day of June, 2005

JON W. DUDAS
*Director of the United States Patent and Trademark Office*